United States Patent
Campbell-Lloyd

(10) Patent No.: US 9,322,167 B2
(45) Date of Patent: Apr. 26, 2016

(54) DECKING OR FLOORING SYSTEM, AND COMPONENTS THEREFOR

(76) Inventor: Peter Charles Campbell-Lloyd, Southport Queensland (AU)

(*) Notice: Subject to any disclaimer, the term of this patent is extended or adjusted under 35 U.S.C. 154(b) by 159 days.

(21) Appl. No.: 13/514,922

(22) PCT Filed: Dec. 8, 2010

(86) PCT No.: PCT/AU2010/001657
§ 371 (c)(1), (2), (4) Date: Aug. 17, 2012

(87) PCT Pub. No.: WO2011/069198
PCT Pub. Date: Jun. 16, 2011

(65) Prior Publication Data
US 2012/0311952 A1    Dec. 13, 2012

(30) Foreign Application Priority Data
Dec. 8, 2009   (AU) ................................ 2009905992

(51) Int. Cl.
*E04B 5/00* (2006.01)
*E04B 5/12* (2006.01)
(Continued)

(52) U.S. Cl.
CPC . *E04B 5/12* (2013.01); *E04B 5/023* (2013.01); *E04F 15/02022* (2013.01); *E04F 15/02038* (2013.01); *E04F 21/1855* (2013.01); *F16B 5/002* (2013.01)

(58) Field of Classification Search
CPC .................... E04F 2201/05; E04F 2201/0523; E04F 15/02; E04F 21/1855; E04F 15/02022; E04F 15/02038; E04B 5/12; E04B 5/023; F16B 5/002

USPC ........ 52/396.04, 396.05, 586.1, 586.2, 582.1, 52/585.1; 403/298
See application file for complete search history.

(56) References Cited

U.S. PATENT DOCUMENTS 3,563,582 A * 2/1971 Shroyer et al. ............. 52/309.13
6,449,918 B1 * 9/2002 Nelson ......................... 52/582.1
(Continued)

FOREIGN PATENT DOCUMENTS

EP           1207246          5/2002

OTHER PUBLICATIONS

IPRP for related PCT/AU2010/001657 completed on Mar. 22, 2012.
(Continued)

*Primary Examiner* — Adriana Figueroa
(74) *Attorney, Agent, or Firm* — Ladas & Parry, LLP

(57) ABSTRACT

A connector for a pair of decking boards, having grooves or recesses in their side walls, laid end-to end, has at least one connector member with parallel side edges arranged for "wedging-type" engagement with the grooves or recesses across the joint between the adjacent ends of a pair of the decking boards. A bridging member extends substantially from the connector member, optionally interconnects a pair of the connector members, and is received in rebates in the adjacent ends of the pair of decking boards at the joint. The bridging member is relatively rigid in the vertical plane; but may be telescopic, or may flex, in the horizontal plane; when in use. The decking boards are laid on a support structure, with respective connector members overlapping the joint between the ends of a pair of the decking boards, so that the connector members of the connector at the joint engage the respective grooves or recesses of the adjacent overlapping decking boards, and the bridging member(s) engage in respective rebates.

20 Claims, 19 Drawing Sheets

(51) Int. Cl.
  *E04F 15/02* (2006.01)
  *E04B 5/02* (2006.01)
  *E04F 21/18* (2006.01)
  *F16B 5/00* (2006.01)

(56) References Cited

U.S. PATENT DOCUMENTS 6,763,643 B1 * 7/2004 Mårtensson .................. 52/586.1
6,920,732 B2 * 7/2005 Mårtensson .................. 52/586.1
2001/0010139 A1 * 8/2001 De Kerpel et al. .............. 52/479
2002/0031646 A1    3/2002 Chen et al.
2002/0194807 A1 * 12/2002 Nelson et al. ................. 52/582.1
2004/0060255 A1 * 4/2004 Knauseder .................... 52/582.2
2008/0250744 A1 * 10/2008 Hrovath et al. ............. 52/582.1
2009/0241460 A1 * 10/2009 Beaulieu ...................... 52/586.2
2009/0249730 A1   10/2009 Vibiano

OTHER PUBLICATIONS

WO for related PCT/AU2010/001657 completed on Jan. 19, 2011.
ISR for related PCT/AU2010/001657 mailed on Jan. 27, 2011.

* cited by examiner

DECKING OR FLOORING SYSTEM, AND COMPONENTS THEREFOR

CROSS-REFERENCE TO RELATED APPLICATIONS

This application is the U.S. National Stage of International Patent Application No. PCT/AU2010/001657 filed on Dec. 8, 2010, which claims priority to Australian Patent Application No. 2009905992 filed on Dec. 8, 2009 the disclosures of which are hereby incorporated by reference in their entireties.

BACKGROUND OF THE INVENTION

1. Field of the Invention

THIS INVENTION relates to decking or flooring systems, and to components for such systems.

The invention particularly relates, but is not limited to, decking or flooring systems enabling (substantially) concealed joining of the adjacent ends of decking boards or flooring boards; and to the "connectors" and decking boards or floorboards suitable for the flooring system.

Throughout the specification, the terms "decking system" or "decking systems" shall be used to include decking systems, flooring systems, wall systems (e.g. wall cladding), ceiling systems and other building construction systems.

Throughout the specification, the term "decking boards" shall be used to include decking boards, floorboards, wall cladding, ceiling cladding and the like.

2. Prior Art

Modern building construction methods are primarily based on "modular" spacing of the frame components, including the wall studs, the decking- or flooring joists, the roof or ceiling battens, and the like: Typically, the modular spacing is 450 mm (=18 inches); although modular spacing's of 300 mm (=12 inches) or 600 mm (=24 inches) are sometimes used Until recently, the decking boards for decking systems were secured to the supporting joists by nails, screws or other like fasteners. These systems had a number of limitations, especially when the upper surfaces of the decking boards were to be left exposed.

Various decking systems have been produced where the decking boards have complementary interlocking profiles along respective side walls of the decking boards. Typically, one side wall of each decking board has a projection, or tongue, engageable in a complementary recess or groove in the other side wall of a similar decking board, when the two decking boards are placed together. In some examples of these systems, the projections may be releasably lockable within the recesses or grooves, with the projections typically having hook-like profiles in end view.

A further type of decking system which has been adopted uses fixing members, commonly called "biscuits", which are placed at (usually regular) spacings along the decking joists and are engageable in the recesses or grooves, having parallel sides, provided along the side walls of the decking boards. Typically, with these decking systems, the first decking board is laid on the decking joists, a set of biscuits is engaged in the recess or groove of the first decking board, the biscuits are fixed to their respective decking joists; and a second decking board is placed in position, with one side wall engaged with a first set of biscuits, and then secured along its other side wall by a second set of biscuits fixed to their respective decking joists.

All of the existing decking systems hereinbefore described have one or more practical limitations, e.g. in the requirements for their installation.

However, one limitation with all the existing flooring systems is the inability to maintain the decking boards in secure (i.e., non-rattling) fixing to the supporting joists, as the decking boards typically undergo expansion and contraction due to differences in temperature and/or (more particularly) humidity in the building locations, where they are installed.

Any decking system which is subject to "rattling" or "drumming" of the decking boards, as the decking is traversed, is unacceptable to the market place.

A further, more important, limitation has been the need to fix the adjacent ends of the decking boards to the joists to prevent flexing of the decking boards when the decking is in use.

The decking boards are typically supplied not cut to accurate lengths. For example, "2.7 meter" decking boards will be at least 2.7 meters long, but may be nearly 3 meters long. So their ends can be fixed at the joists, they must be cut to precisely 2.7 meters (2700 mm) long, so that their length is (N×450)mm long (where N is a whole number).

The time for installing decking is increased, when each decking board has to be accurately cut to length; and the wastage of the timber of the decking boards may be of the order of 7 to 10%, or higher.

SUMMARY OF THE INVENTION

It is an object of the present invention to provide a decking system, as hereinbefore defined, which overcomes; or ameliorates, the limitation(s) of the prior art decking systems.

It is a preferred object of the present invention to provide a decking system which will enable easy, but secure, interconnection of adjacent ends of the decking boards, whilst accommodating expansion or contraction of the decking boards.

It is a further preferred object of the present invention to provide such a decking, system where the adjacent ends of the decking boards may be interconnected intermediate the supporting construction (e.g. intermediate the decking joists).

It is a still further preferred object of the present invention to provide complementary profiles on the decking connectors and the grooves or recesses in the decking boards to form a "wedging" engagement therebetween.

It is a still further preferred object of the present invention to provide connectors for the decking system which can be used with decking boards within a range of thicknesses.

It is a still further preferred object of the present invention to provide connectors for the decking system which can accommodate decking boards having a range of different widths.

Other preferred objects of the present invention will become apparent from the following description.

In one aspect, the present invention resides in a connector for interconnecting adjacent ends of a pair of decking boards of a decking system (as hereinbefore defined), the connector including:

a connecting member, the connecting member having a body defined by a pair of substantially parallel side edges in plan view, a first, or inner, of the pair of side edges being operable to engage grooves or recesses in aligned side walls of the pair of decking boards, across a joint between the respective ends of the pair of decking boards.

Preferably, a second, or outer, of the side edges of each body engages a groove or recess in the side wall of a decking board laid adjacent the joint between the adjacent ends of the pair of decking boards.

More preferably, the second side edge engages such a groove or recess intermediate the length of a decking board laid adjacent the joint, i.e. the respective joints between adjacent ends of the pairs of decking boards are staggered or offset.

Preferably, the side edges of the bodies may be of convergent profile in end view, and are operable to engage the grooves or recesses of the pair of decking boards having complementary profiles.

Preferably, the side edges of the bodies engage the grooves or recesses in the side walls of the respective decking boards in a "wedge-type" engagement.

In one arrangement, the connector has a pair of the connector members interconnected by a bridging member, which preferably engages respective rebates in the adjacent ends of the pair of decking boards.

Preferably, the bridging member is adjustable in length in a horizontal plane, but is relatively rigid (or non-deflectable) in a vertical plane, when in use.

Preferably, in one embodiment, the bridging member is capable of flexing, e.g. in a substantially "S-shape", "V-shape" or "U-shape" (in plan view) in the horizontal plane, when in use. In an alternative embodiment, the bridging member is telescopic or otherwise adjustable in length to be used with decking boards having a variable width range of, e.g. 10-50 mm, more preferably 20-30 mm.

In an alternative arrangement, the connector has a single connector member with a bridging member extending substantially-laterally there-from, the bridging member engaging in respective rebates in the adjacent ends of the pair of decking boards.

Preferably, the bridging member is relatively rigid (or non-deflectable) in a vertical plane, when in use.

Preferably, the length of the bridging member is selected so that at least a small clearance is provided between distal ends of the respective bridging members of a pair of the connectors at the joint between the ends of the pair of decking boards.

Preferably, the bridging member has at least one reinforcing rib or flange lying in the vertical plane, when in use; and may be, e.g. of "T-shape", "inverted U-shape", triangular-, cruciform-, circular- or box-section, or other like shape.

Preferably, the bridging member has at least one horizontal top surface engageable by the respective substantially horizontal top walls of the rebates in the ends of the adjacent pair of decking boards.

Preferably, the top surface of the bridging member has a drainage groove to enable moisture collected thereon to drain to a distal end of the bridging member or to a drain-hole in the bridging member.

Preferably, the connector is integrally manufactured, e.g. by injection moulding, from a suitable polymer/plastics-material, such as nylon (Registered Trade Mark), polyvinyl chloride (PVC), polyethylene, polypropylene, where the material is preferably UV-stabilised; cast or moulded from metals, such as aluminium; and may incorporate glass-, carbon- or other reinforcing, fibres for increased mechanical strength.

The body of each connector member may have a lower body portion, including at least one block portion, surmounted by an upper body portion having the substantially parallel side edges. Reinforcing ribs and/or flanges may be provided on the side and/or end walls of the lower body portions to increase the mechanical strength thereof; while being able to absorb, e.g. 1-2 mm expansion of the adjacent decking boards, when in use.

Preferably, the upper body portions are of solid construction, and may have a substantially planar or convex top face interconnecting the elongate upper faces of the side edges, where the elongate upper faces of the side edges may be connected to complementary elongate lower faces on the side edges by a curved nose.

Preferably, the body had a bore extending therethrough to enable the body to be secured to a supporting structure underlying the joint between the ends of the pair of decking boards.

In a second aspect, the present invention resides in a decking system (as hereinbefore defined) including:

a supporting structure;

a plurality of decking boards, as hereinbefore described, laid on the supporting structure, with each of the decking boards having respective recesses or grooves in their side walls and, optionally, rebates in their end walls; and a plurality of the connectors, as hereinbefore described; wherein:

the, or each, connector has at least one connector member operably engaged with the grooves or recesses in aligned side walls of a pair of the decking boards arranged end-to-end across a joint, the, or each, connector securing adjacent ends of the decking boards together.

Preferably, the bridging member of each connector is engaged in the rebates of the adjacent ends of the pair of decking boards.

Preferably, the respective connecting members of each connector are also operably engaged in the grooves or recesses in the adjacent side walls of respective decking boards laid adjacent to, and optionally overlapping, the joint between the adjacent ends of the pair of decking boards.

BRIEF DESCRIPTION OF THE DRAWINGS

To enable the invention to be fully understood, preferred embodiments will now be described with respect to the accompanying drawings, in which.

NB: Any notations on the drawings are by way of illustration only, and are not limiting to the present invention.

DETAILED DESCRIPTION OF THE PREFERRED EMBODIMENTS

Figure 1:
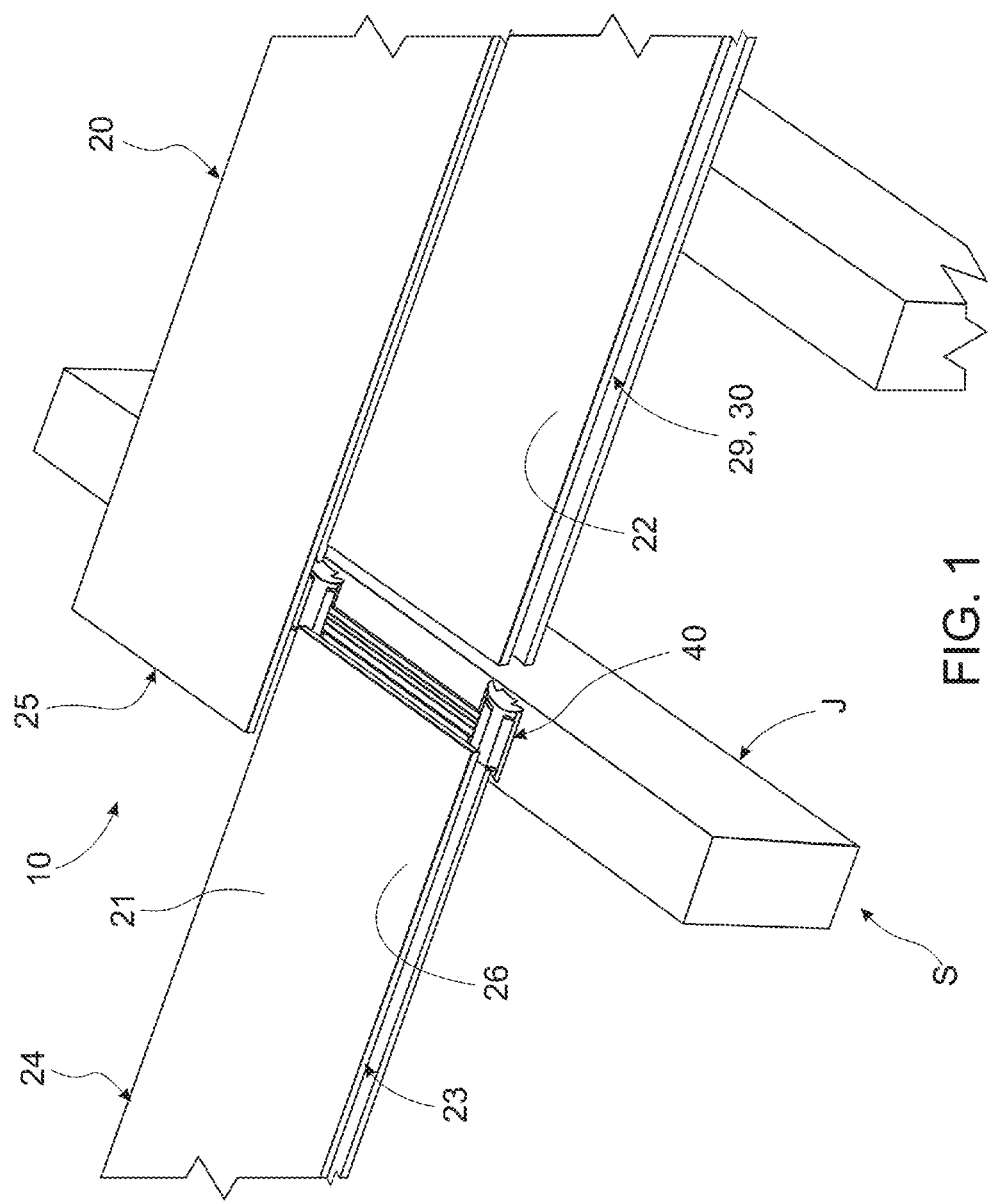
FIG. 1 is a perspective view showing a connector of a first embodiment of the present invention arranged to interconnect the ends of a pair of decking boards over a joist of a supporting structure.

Referring to FIG. 1, the decking system 10 has a support structure S comprising a plurality of joists J provided at modular spacings of, e.g. 450 mm.

The decking system 10 has a plurality of decking boards 20, formed from suitable timber, such as "Merbau" (Class 1 or 2 hardwood), typically of 85 mm-115 mm width and 18-25 mm thickness. These dimensions are non-limiting.

The boards 20 (see FIGS. 2 and 16) have planar top and bottom faces 21, 22; elongate side faces 23, 24; and transverse end faces 25, 26.

Figure 16:
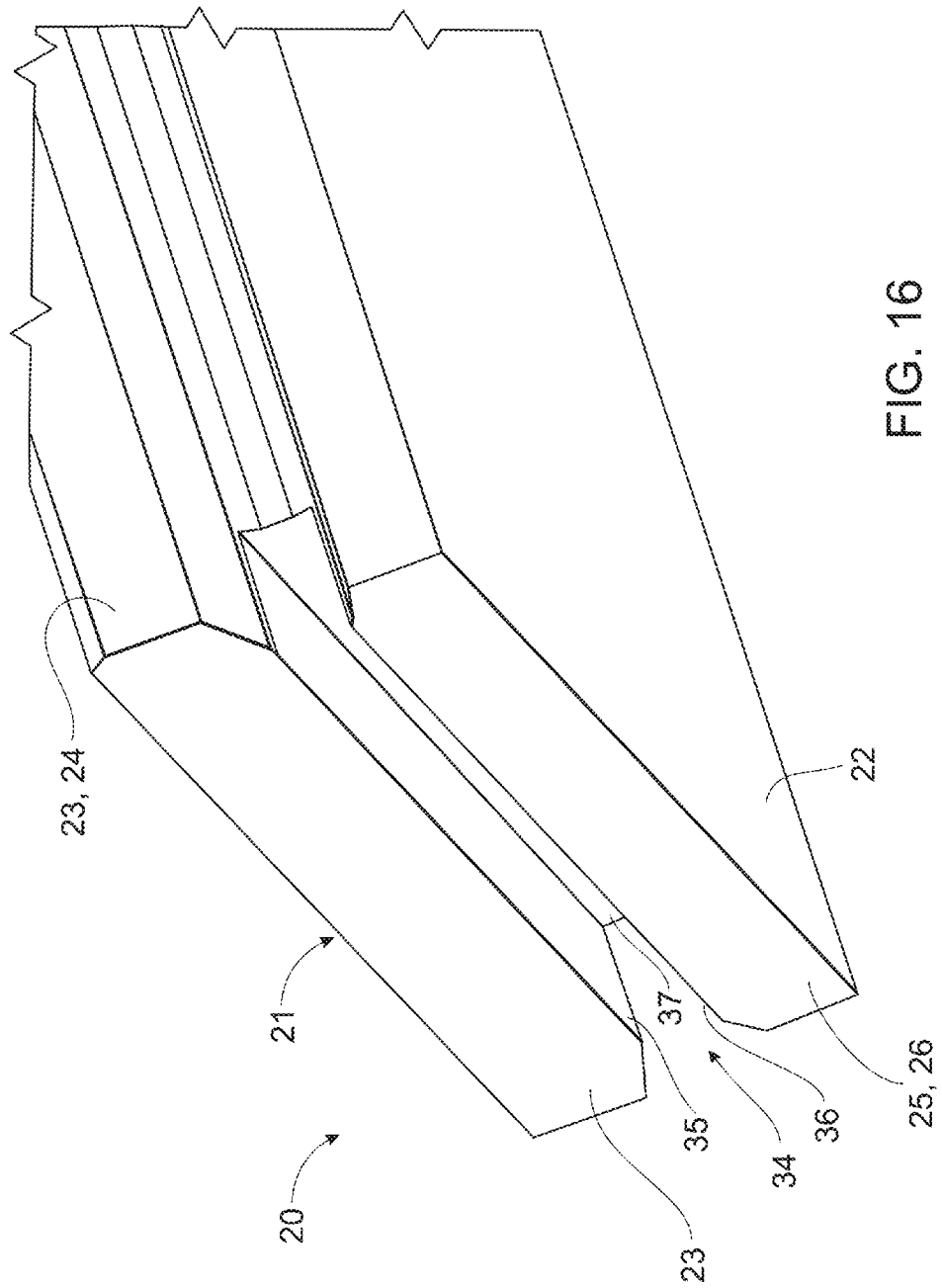
FIG. 16 is a perspective view of the junction of one side wall and one end wall of a decking board.

The side faces 23, 24 are provided with elongate grooves 29, 30, which have inwardly-convergent top and bottom faces 31, 32 interconnected by a concave inner face 33 (see FIG. 16).

The rebates 34 in the end faces 25, 26 of the decking boards 20 have parallel top and bottom faces 35, 36 connected by a vertical inner face 37. It should be noted that this shape of the rebate is exemplary only and any suitable shape known to a skilled addressee may be used As illustrated in FIG. 1, the adjacent ends 25, 26 of a pair of decking boards 20 may be connected over a joist J by a connector 40 to be hereinafter described.

Alternatively, as illustrated in FIGS. 2 to 5, the adjacent ends 25, 26 of the pair of decking boards 20 may be interconnected intermediate the joists J by the connector 40.

It will be noted by the skilled addressee, from the following description that, any vertical deflecting loads applied to the adjacent ends 25, 26 of the decking boards 20 are not only distributed between that pair of decking boards 20, but are also distributed to the respective decking boards 20 lying along either side of the joint.

Figure 6:
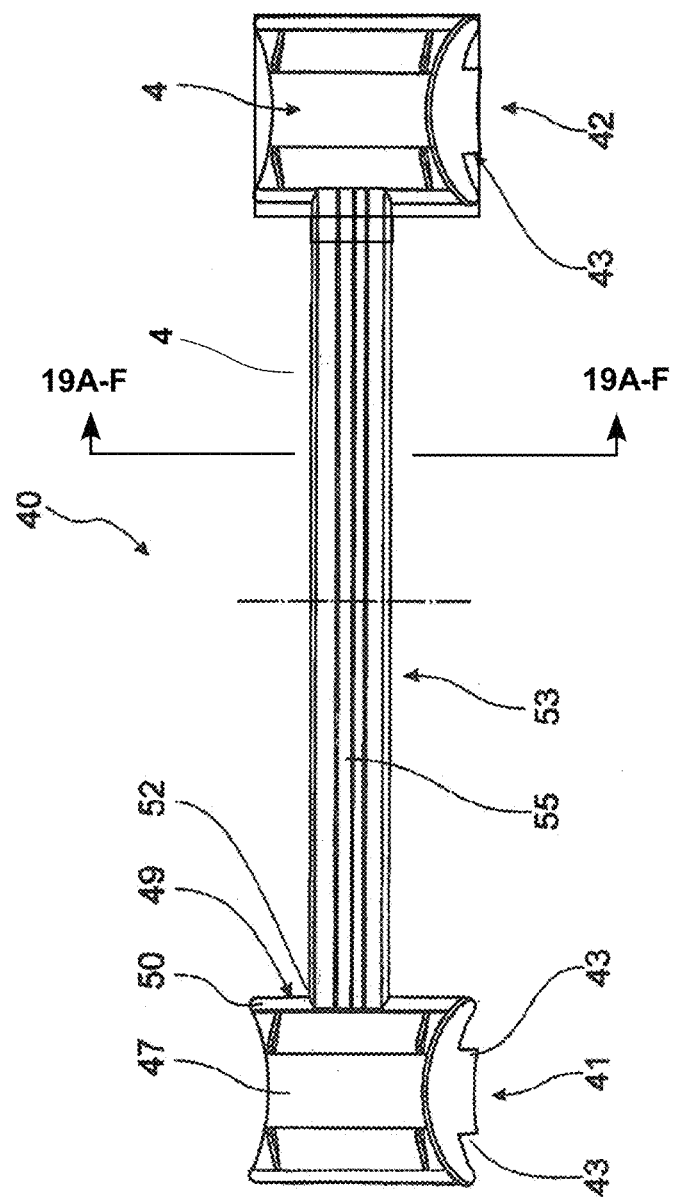
FIG. 6 is a perspective top, view of the connector.
Figure 7:
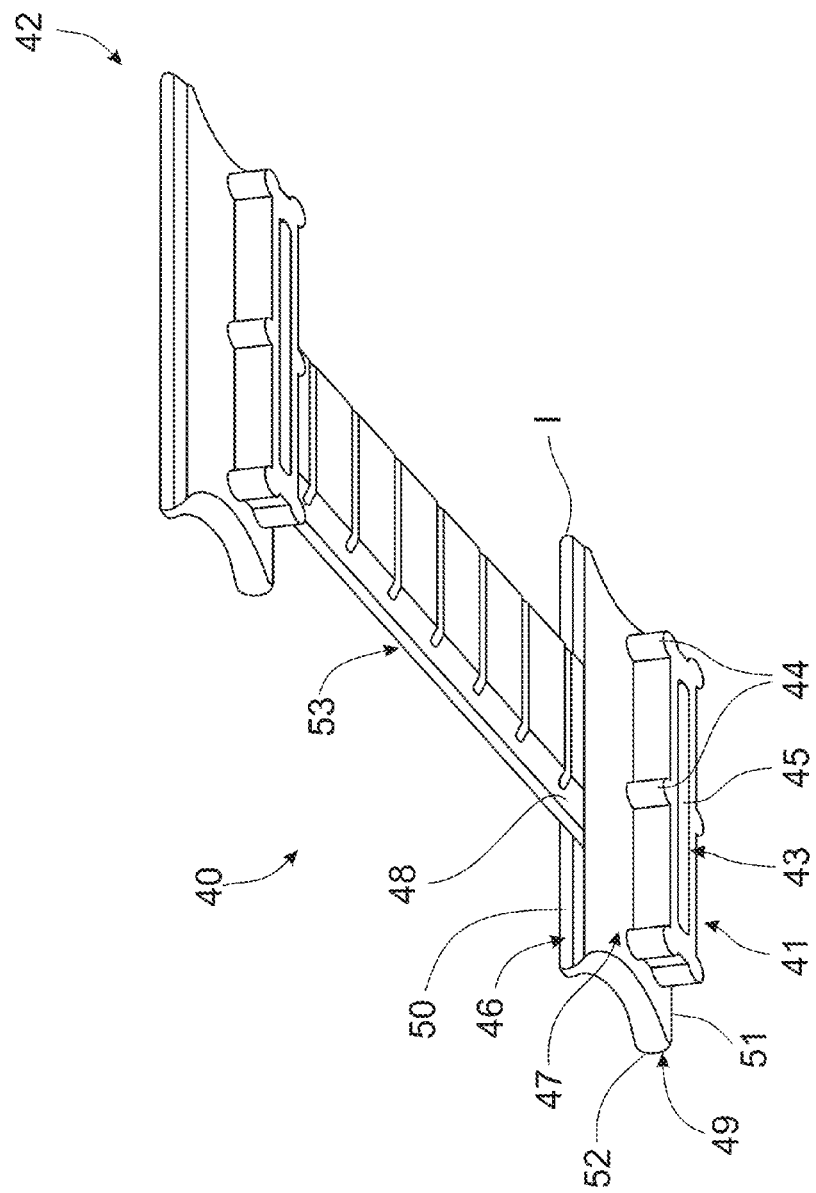
FIG. 7 is a bottom perspective view corresponding to FIG. 6.

Referring to FIGS. 6 and 7, the connector 40 has respective connector members 41, 42 provided as a mirror-image pair.

For ease of description, connector member 41 will be described in detail, and the skilled addressee will appreciate that the reference numerals for the features of connector member 41 will also apply to the corresponding features of the connecting member 42.

Connector member 41 has a lower body portion 43 which is substantially rectangular in bottom plan view and is provided with laterally-extending ribs 44 arranged to absorb lateral expansion (or contraction) of the adjacent decking boards 20 with which it is engaged. The lower body portion 43 may have a cavity 45 to reduce the volume of plastics-material required for manufacture of the connector 40.

The connecting member 41 has an upper body portion 46 terminated by concave end faces 47, 48, and is defined by parallel outer side edges 49 with convergent top and bottom faces 50, 51 interconnected by a convex nose 52.

Figure 2:
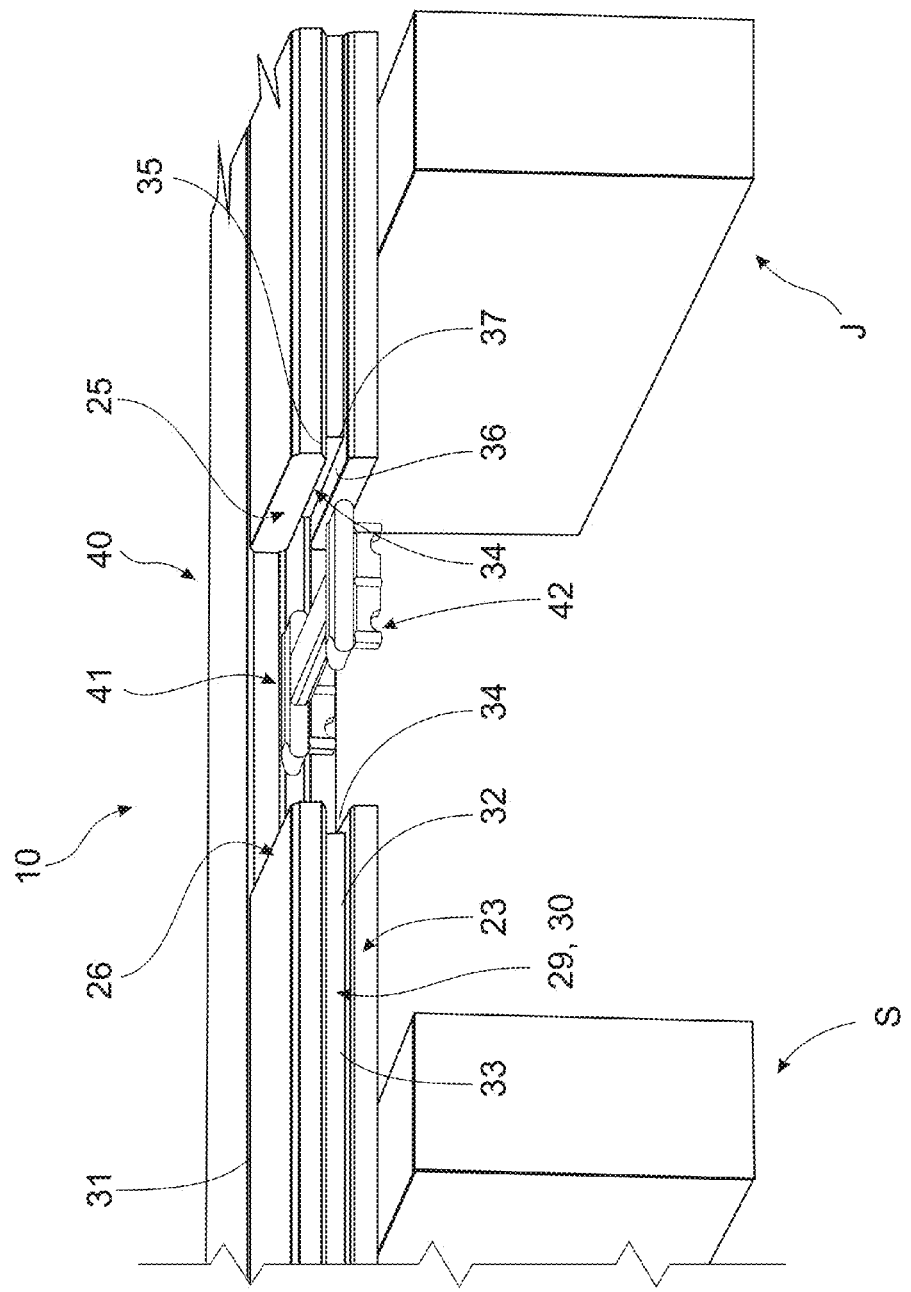
FIG. 2 is a perspective view showing the connector arranged to interconnect the adjacent ends of a pair of decking boards intermediate the joists of the supporting structure.
Figure 3:
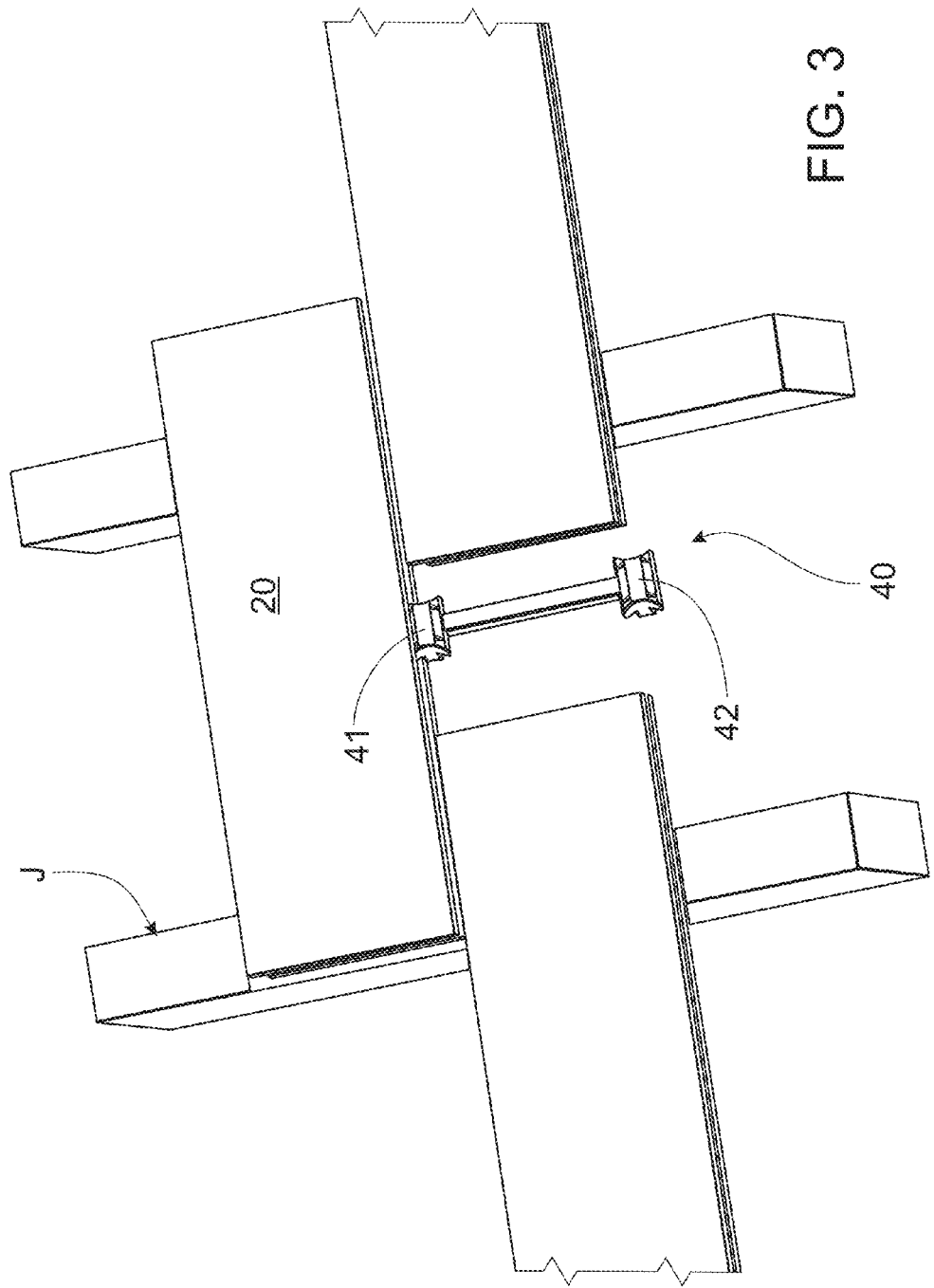
FIG. 3 is a perspective top view corresponding to FIG. 2.
Figure 4:
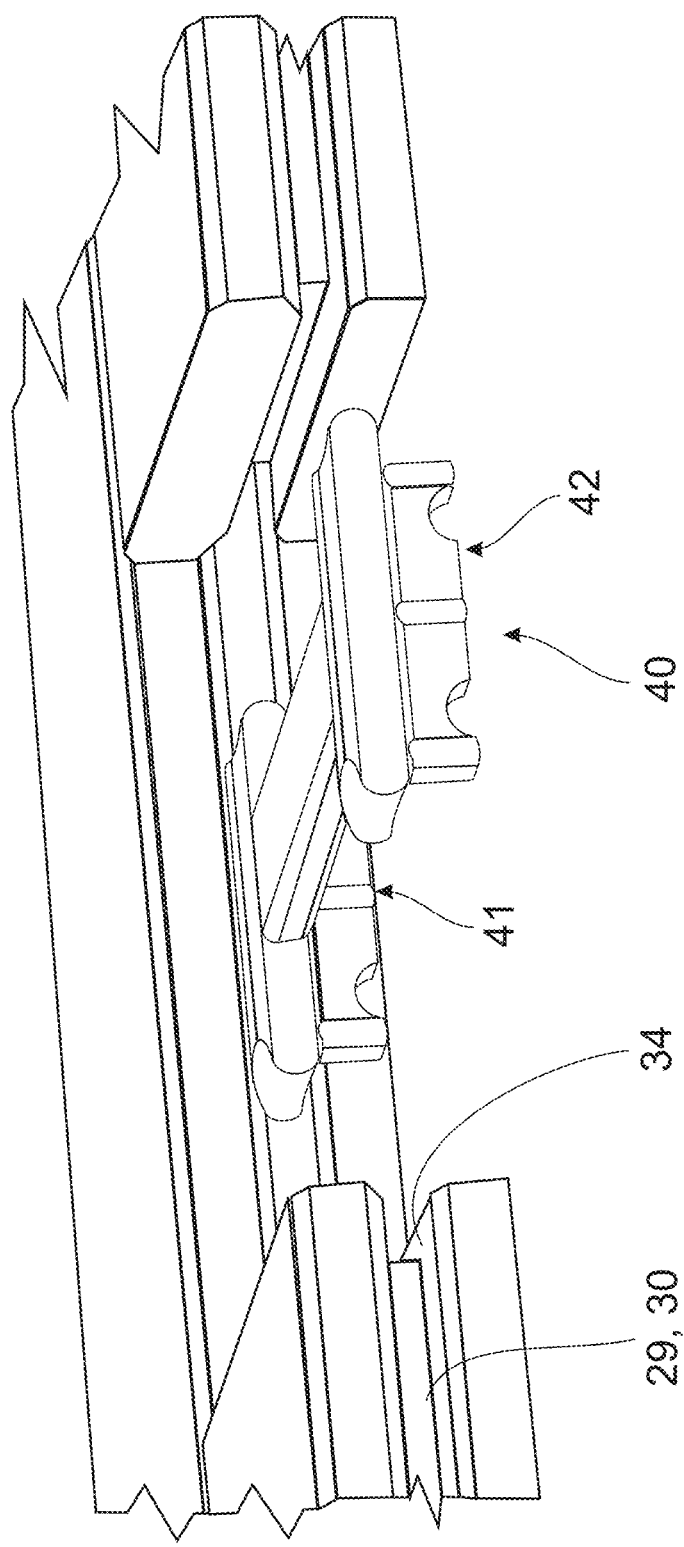
FIG. 4 is a perspective front view, corresponding to FIGS. 2 and 3, showing the connector engaged in the rebate in an end of one of the decking boards.
Figure 5:
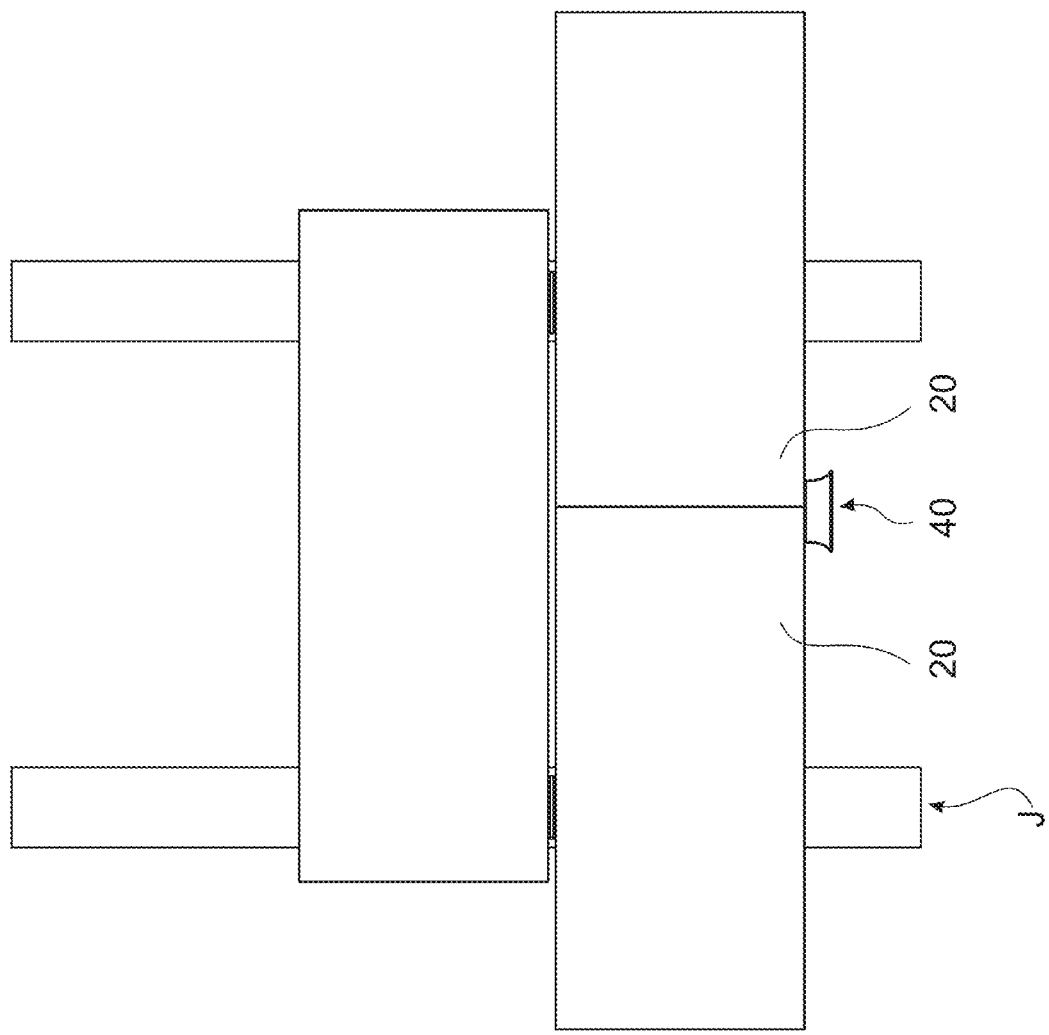
FIG. 5 is a top plan view showing the completed joint between the adjacent ends of the decking boards.

As illustrated in FIGS. 2 to 4, the outer side edge 49 of each connecting member 41, 42 is received in the grooves 29, 30 along the deck boards 20, adjacent the ends 25, 26 of the deck boards 20 being joined together.

The connector members 41, 42 are interconnected, intermediate their respective lengths, by a bridging member 53 of a thickness enabled to be "snugly" received in the opposed rebates 34 in the adjacent ends 25, 26 of the decking boards 20.

The top face 54 of the bridging member 53 has a substantially V-shape groove 55 to enable any moisture entering the joint to be drained away. (A drainhole, not shown, may be provided through the bridging member 53, from the groove 55, to assist in the drainage of the moisture.)

As seen in more detail in FIGS. 6 and 7, the bridging member 53 is formed integrally with the connecting members 41, 42, and the underside is provided with a substantially planar underface 56 operable to engage the lower faces 36 of the respective rebates 34.

The connector 40 is preferably injection-moulded from high strength plastics-material, e.g. HDPE, which may incorporate fibre reinforcing.

In experimental tests, where decking boards 20 of "Merbau" timber, each 115 mm wide×19 mm thick, were laid over the joists J at 450 mm spacing's, a vertical load of 250 kg caused no more than 2 mm vertical deflection of the decking boards 20, where the joint therebetween was equally spaced between the joists J.

Figure 8:
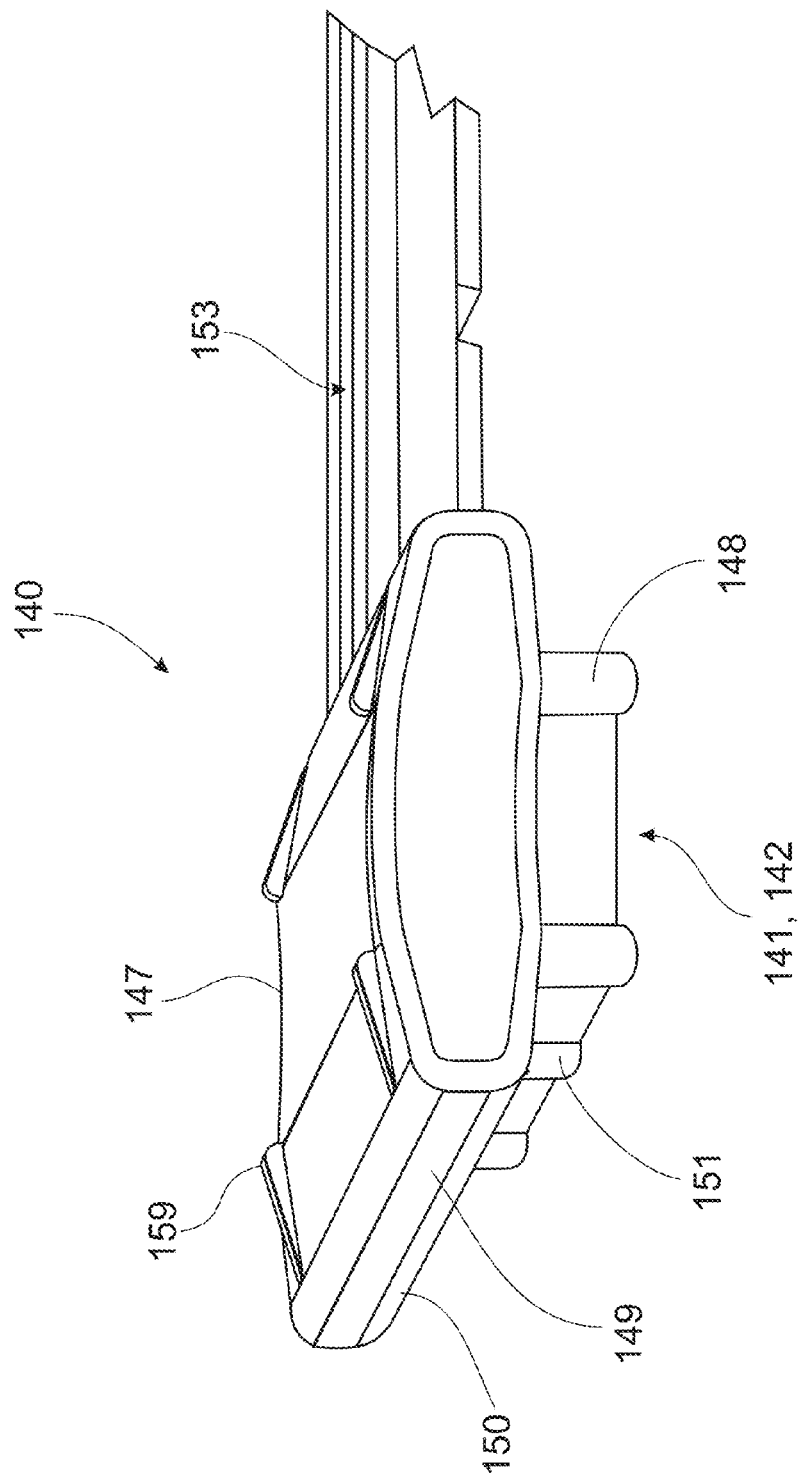
FIG. 8 is a perspective side view of a (modified) second embodiment of the connector.
Figure 9:
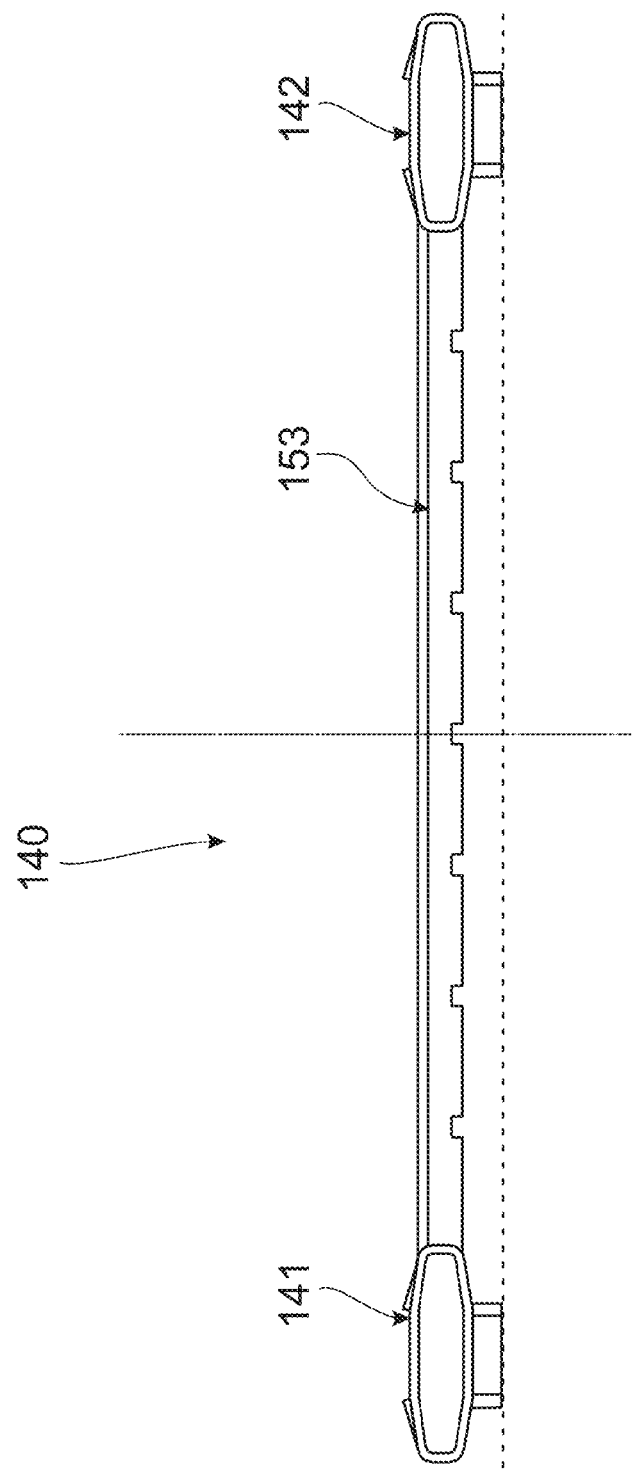
FIG. 9 is a side elevational view thereof.

In an alternative (second) embodiment illustrated in FIGS. 8 and 9, the end faces 147, 148 of the upper body portions 146 of the connector members 141, 142 of the connector 140 are planar, not convex; and flanges 159 on the upper and lower faces 150, 151 adjacent the side edges 149 assist in providing additional wedging engagement between the connector members 141, 142 and the grooves 29, 30 of the decking boards 20 when engaged in use. The bridging member may be formed as a solid component Or alternatively it may be perforated. It may be formed of any suitable configuration including as two spaced arms with an intermediate gap.

In the embodiments illustrated in FIGS. 1 to 7, and 8 and 9, the bridging members 53, 153 are of a fixed length, e.g. to suit decking boards 20 of a width of, e.g. 115 mm.

It will be readily apparent to the skilled addressee that the bridging members 53, 153 may incorporate respective telescopic portions, preferably formed integrally with respective connecting members 41, 42, 141, 142, and telescopically slidable to enable the spacing between the connecting members 41, 42, 141, 142 to be adjusted to suit decking boards 20 with widths, e.g. in the range 85 mm-115 mm.

For example, one of the connecting members 41 may have a bar or rod, forming one portion of the bridging member 53, telescopically received in a bore or a channel in a complementary second portion of the bridging member 53 connected to, or integral with, the other connecting member 42.

In addition to the substantially rectangular cross-section for the bridging members 53, 153 illustrated in the embodiments in FIGS. 1 to 9, the bridging members may be of T-section, inverted U- or V-section, cruciform-section or circular-, square- or rectangular-section, or other suitable section so arranged that the bridging members will oppose any deflection in the vertical direction.

Bridging members having "T-shape" (FIG. 19A), "inverted U-shape" (FIG. 19B), triangular-(FIG. 19C), cruciform-(FIG. 19D), circular-(FIG. 19E) or box-(FIG. 19F) section are shown in FIGS. 19 A-F, respectively.

Figure 10:
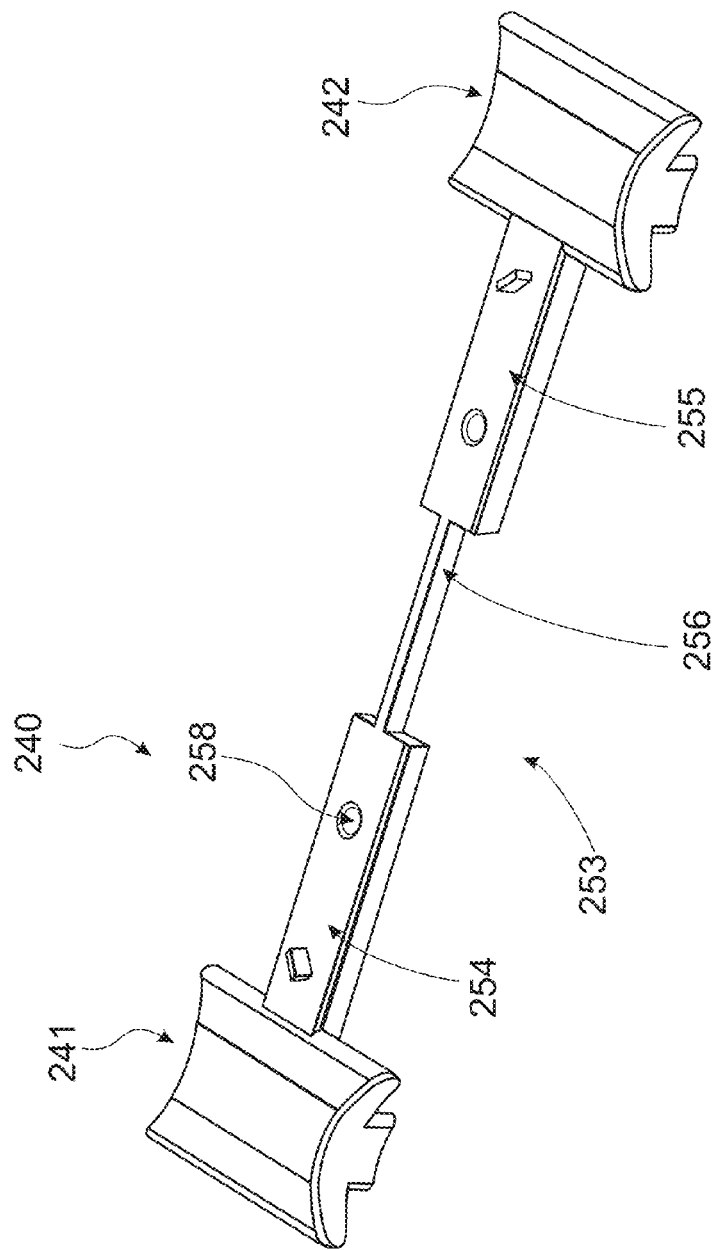
FIG. 10 is a top perspective view of a third embodiment of the connector.
Figure 11:
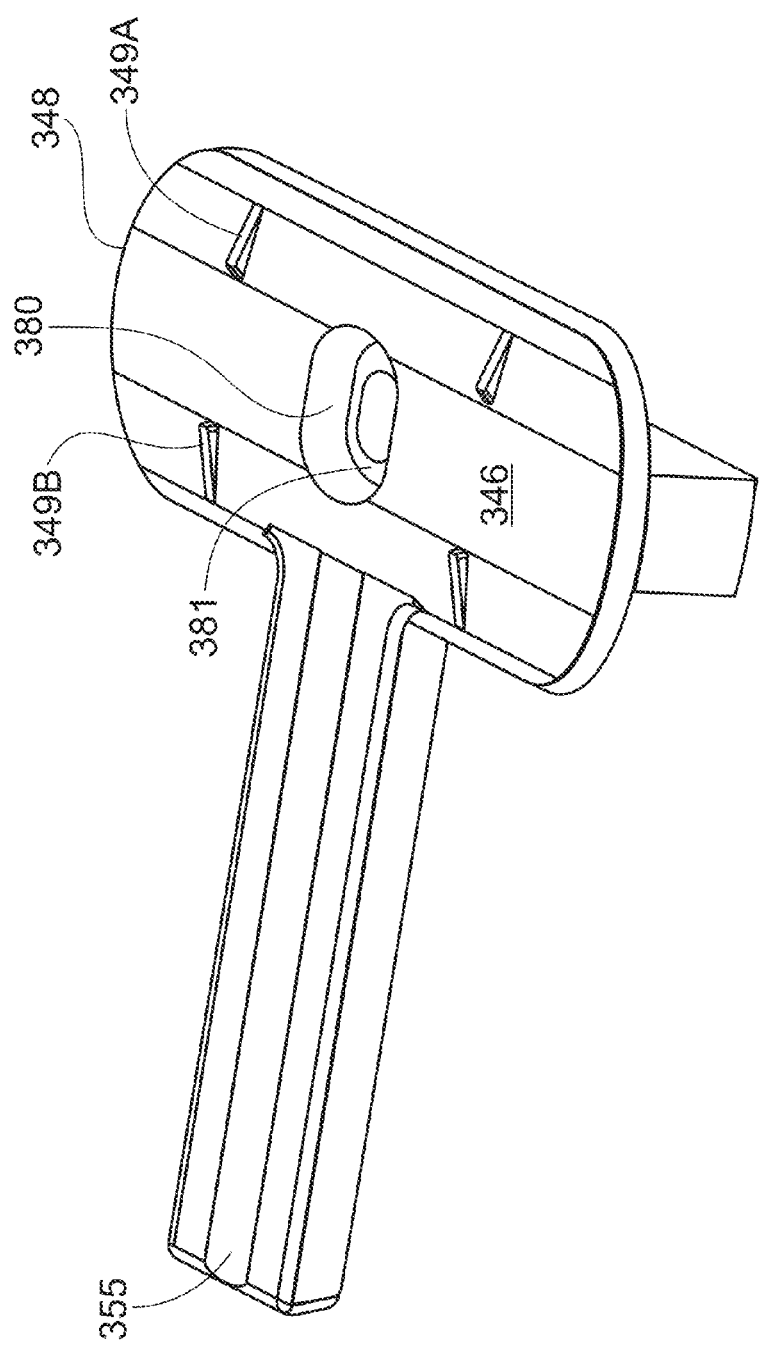
FIG. 11 is a top perspective view of a fourth embodiment of the connector.

FIG. 10 illustrates a third embodiment of the connector 240 where the connector members 241, 242 are connected by a bridge member 253 having relatively rigid outer bridge portions 254, 255 formed integrally with the respective connector members 241, 242; and an immediate bridge portion 256 of reduced width (in top plan view) but of the same thickness, so arranged as to be deflected, e.g. in a substantially S-, U- or V-shape in the "horizontal" plane of the bridging member 253, but opposed to any deflection or deformation in the "vertical" plane perpendicular thereto.

The deflection or flexing of the intermediate bridge portion 256 enables the connector 240 to be used with decking boards 20 having a range of widths, e.g. 85 mm-115 mm.

Flanges 257 may be provided on the outer bridge portions 254, 255 to provide a spacer between the adjacent ends 25, 26 of the decking boards 20. The flanges 257 can absorb limited expansion/contraction of the decking boards 20.

Drain holes 258 may be provided in the outer bridging portions 254, 255 to assist in draining away any moisture which collects in the joint between the ends 25, 26 of the decking boards 20.

FIGS. 11 to 15 illustrate a fourth embodiment of the connector, where connector members 341, 342 are provided as "mirror-image" pairs (or "half-pieces"), and where only connector member 341 will now be described.

Connector member 341 has an upper body portion 346 terminated by convex end faces 347, 348. Wedge-like flanges 349A, 349B on the upper body portion 346 can absorb any tolerances between the elongate grooves 29, 30 in the decking boards 20 and the connector member 341.

A "stepped-bore" 380 is provided through the body of the connector member 341, the bore 380 being substantially-elliptical in plan view, and having a peripheral "shoulder" 381 which is downwardly convergent to sealably engage the underside of the head of a fastener (not shown) used to secure the connector member 341 to a supporting joist J, even when the shank of the fastener is inclined relative to the axis of the bore 380. (By driving the fastener into the joist J at an angle, the force required to pull the fastener free is increased, and the fastener may be more easily fixed in the joist J.)

The connector member 341 has a bridging member 353, where the "V-shaped" drainage groove 355 in the top face 354 is inclined downwardly towards the distal end of the bridging member 353, to allow any moisture to flow to the distal end and drain away.

Figure 12:
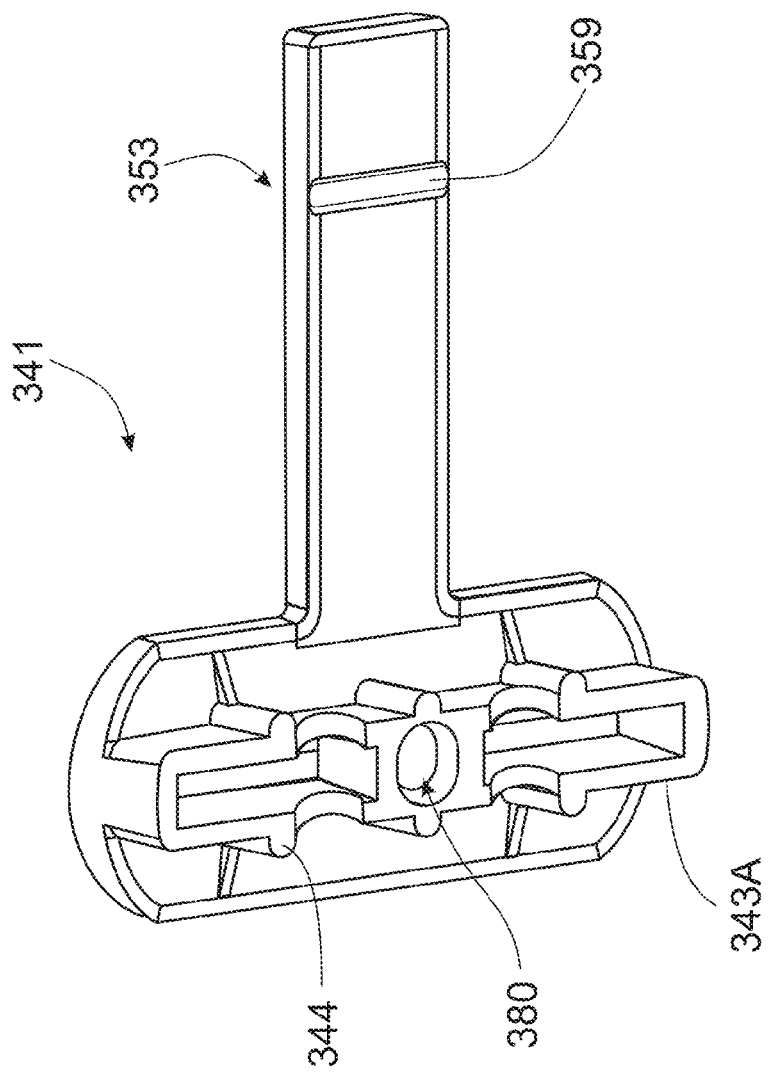
FIG. 12 is a bottom perspective view thereof.
Figure 13:
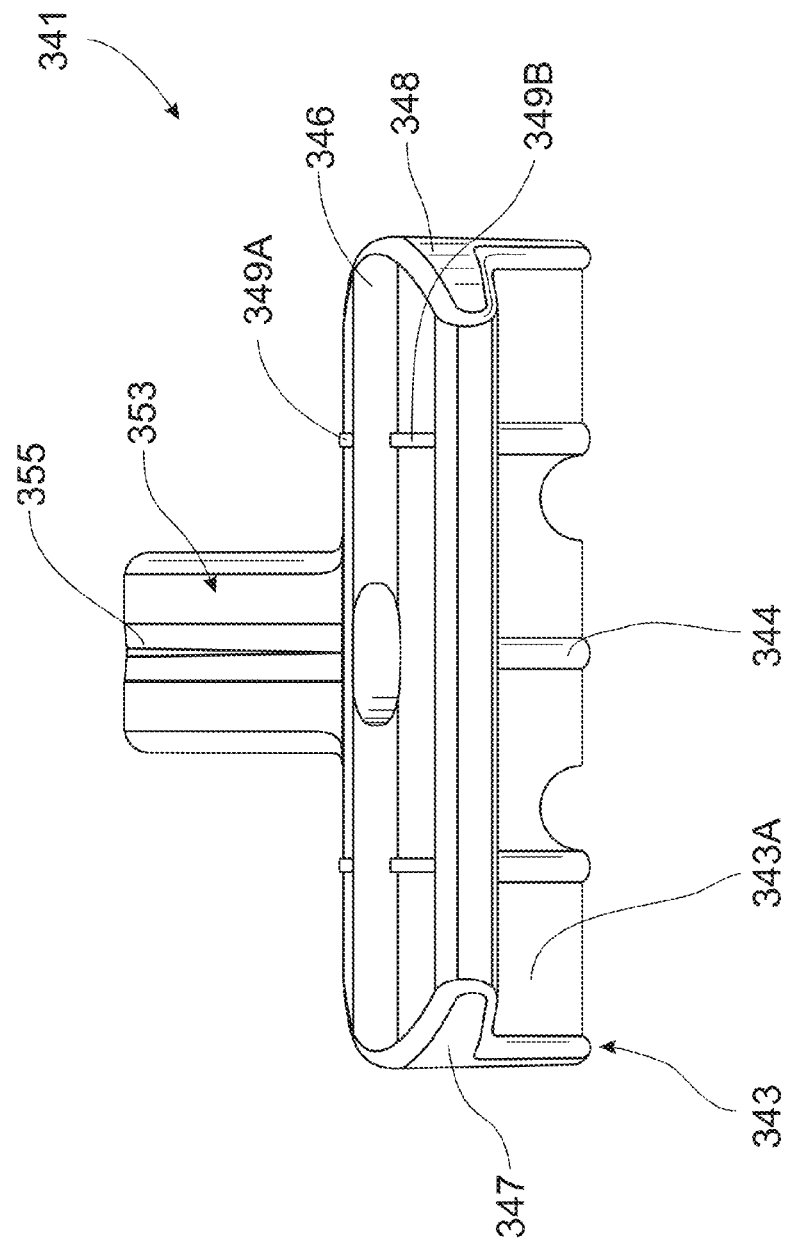
FIG. 13 is side perspective view thereof.
Figure 14:
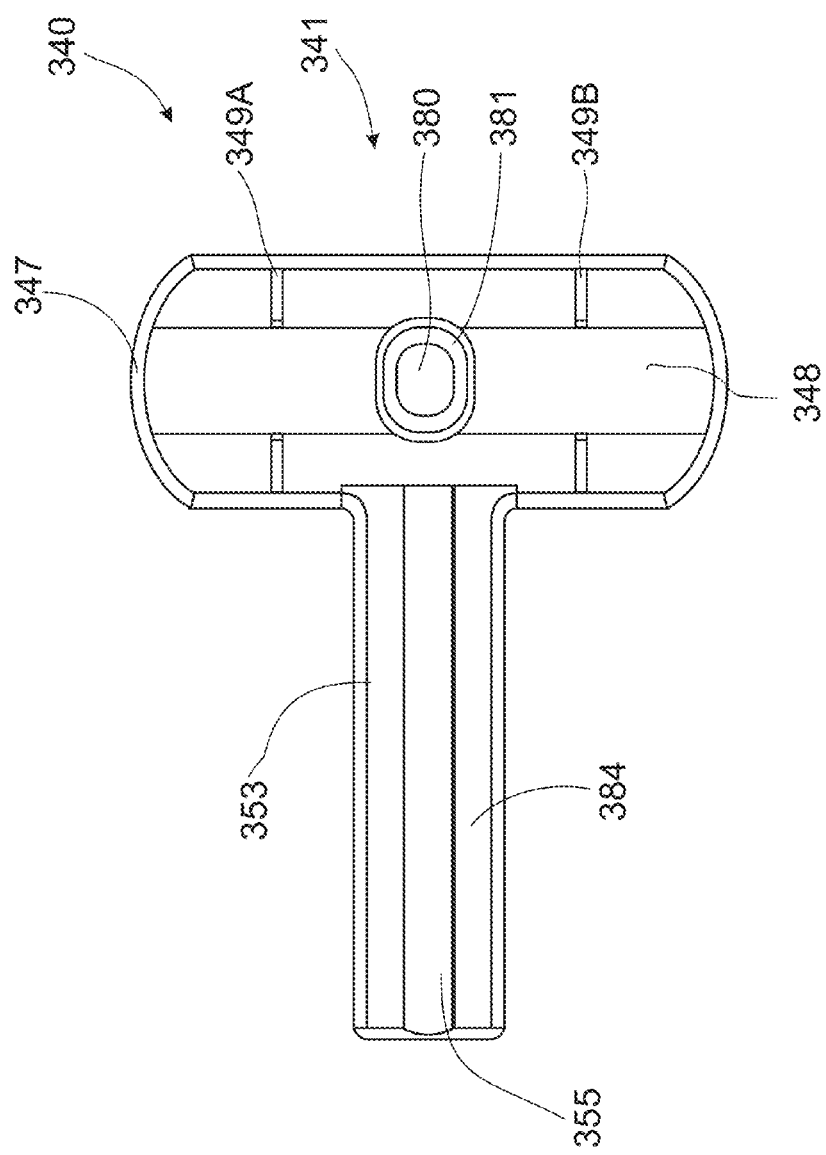
FIG. 14 is a top plan view thereof.
Figure 15:
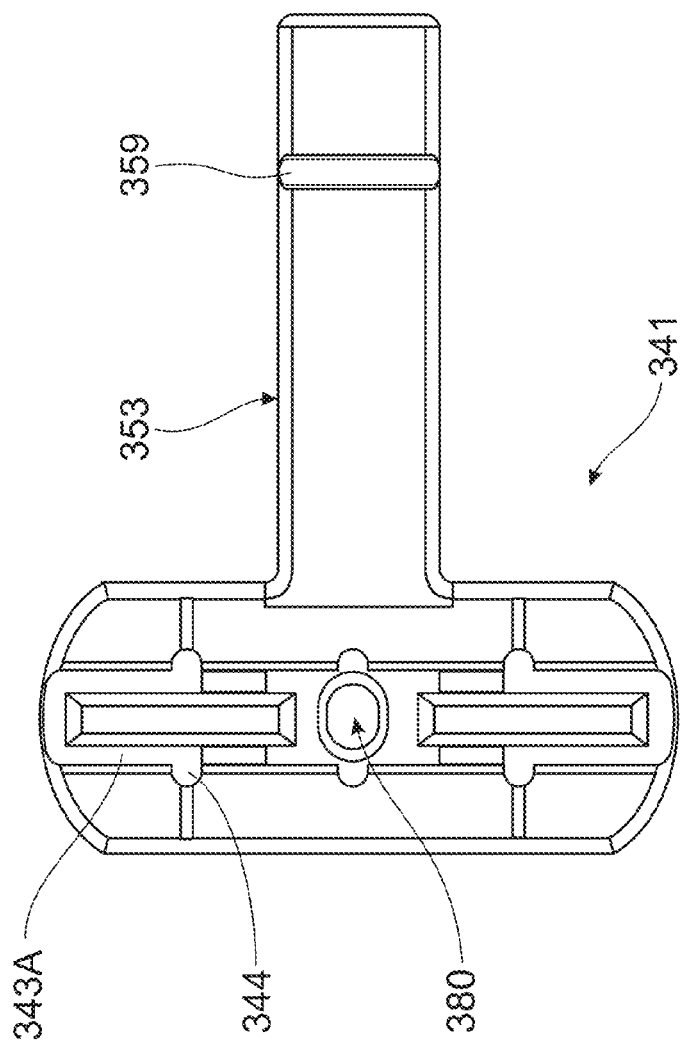
FIG. 15 is a bottom plan view thereof.

As illustrated in FIGS. 12 and 15, "cut-lines" 359 may be provided at spaced intervals in the bottom face of the bridging member 353 to enable the latter to be easily cut to a selected length.

As illustrated in FIG. 15, the lower body portion 343 is formed of substantially U-shaped bands 343A, with the ribs 344 at their distal ends, to absorb lateral expansion or contraction of the adjacent decking boards 20.

Figure 17:
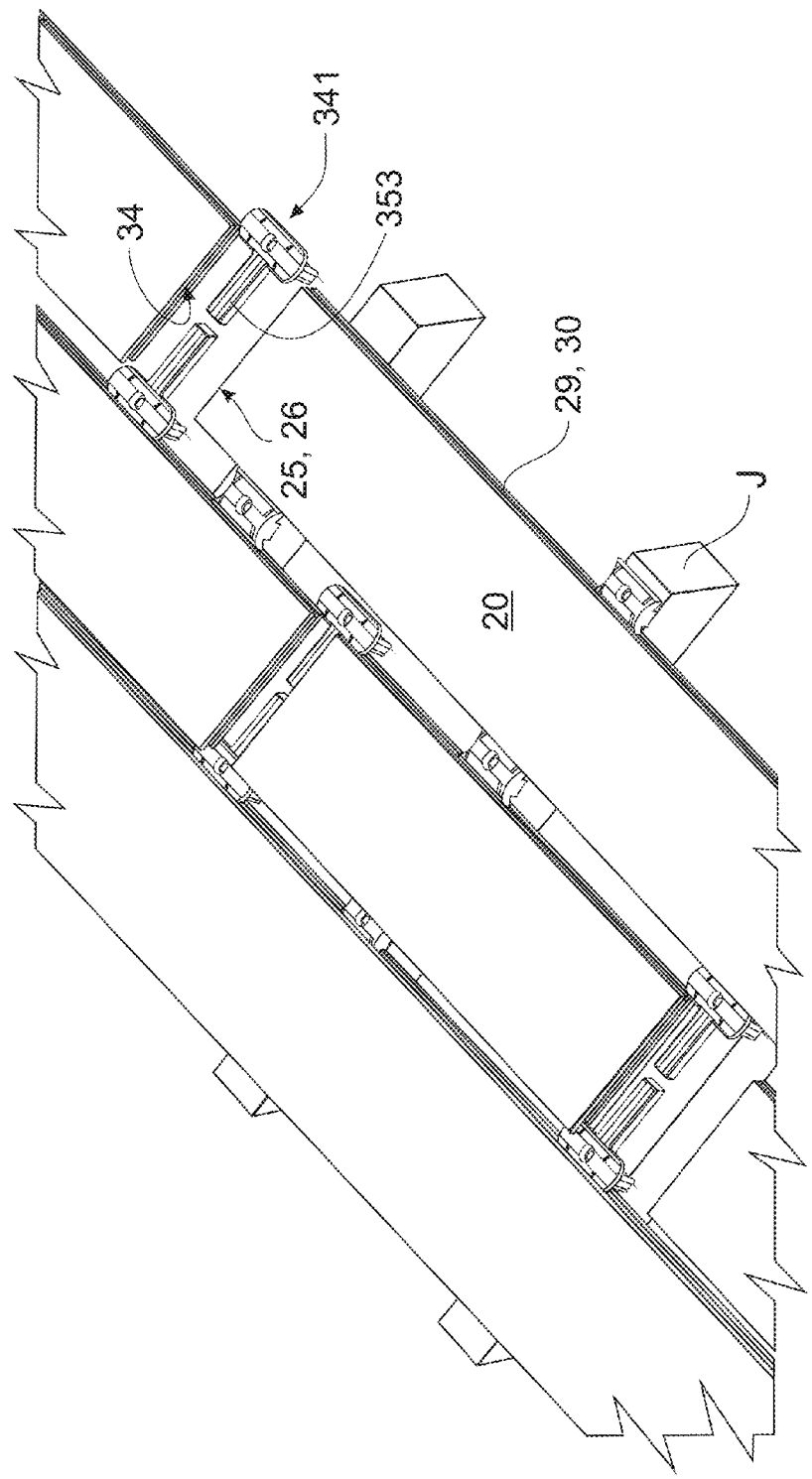
FIG. 17 is a top perspective view showing the connectors of the fourth embodiment interconnecting a plurality of the decking boards supported by the joists of a support structure.
Figure 18:
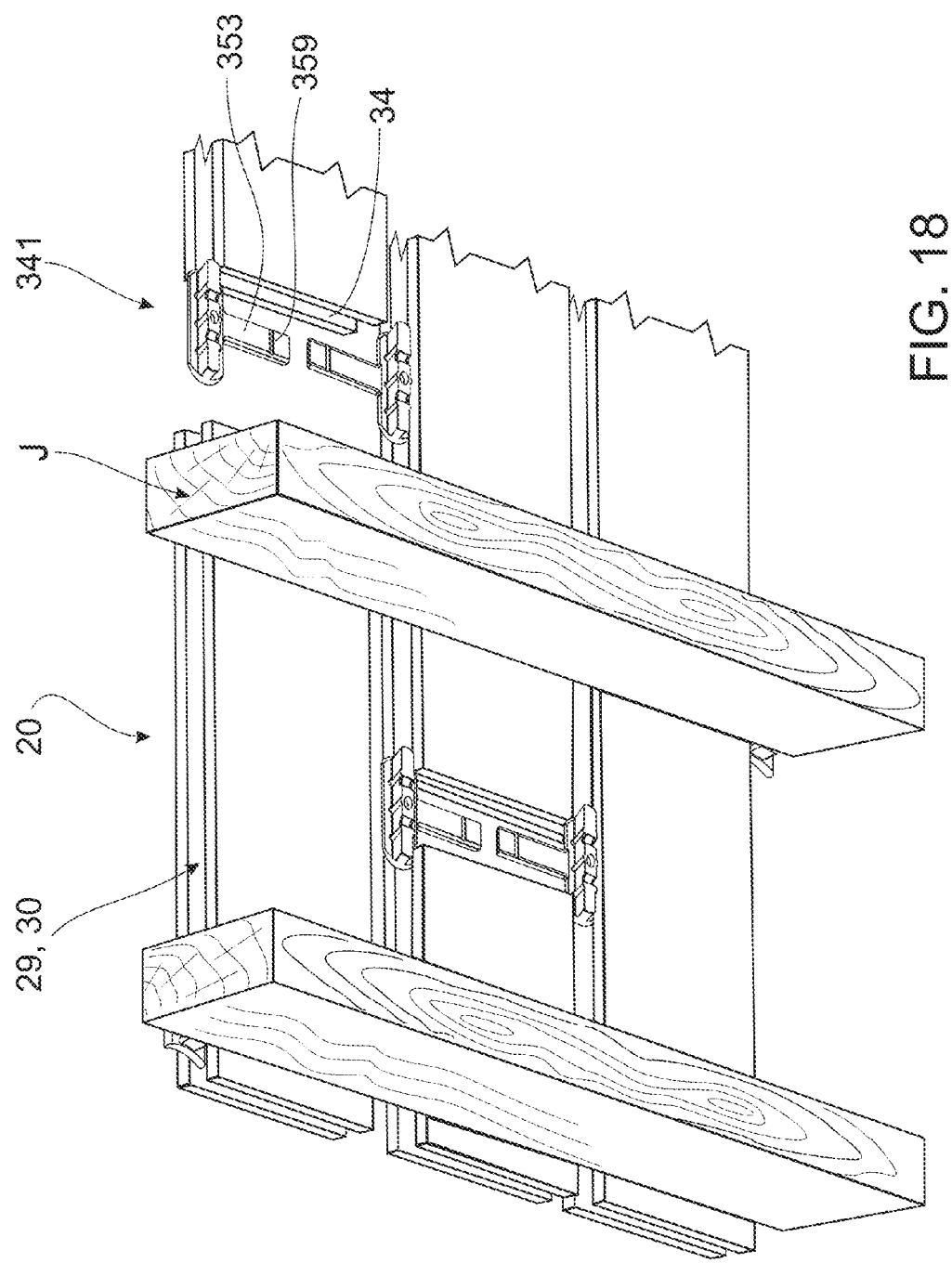
FIG. 18 is a bottom perspective view corresponding to FIG. 17.
Figure 19A:
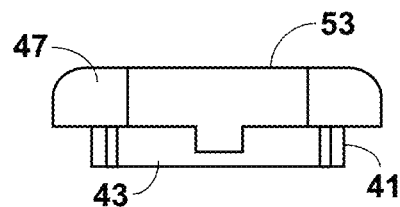
FIG. 19A-F show various section views of the bridging member.
Figure 19B:
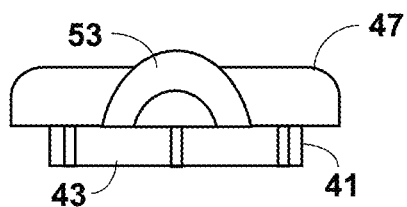
Figure 19C:
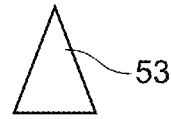
Figure 19D:
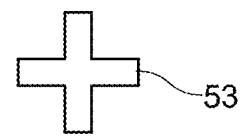
Figure 19E:
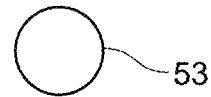
Figure 19F:
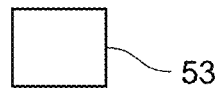

FIGS. 17 and 18 illustrate the use of respective pairs of the connectors of this fourth embodiment interconnecting the adjacent ends of pairs of the decking boards at joints intermediate, or overlying, the joists J. (Where the joints overlie the joists, fasteners (not shown) will secure the bodies of the connector members 341, 342 to the joists J, the fasteners being driven through bores 380.)

As illustrated in FIGS. 17 and 18, the length of the bridging members 353 of the connector members 341, 342 will be selected so that there is a gap between the distal ends of the bridging members 353. The bridging members 353 may be cut to length, using the "cut-lines" 359, before installation.

The skilled addressee will appreciate the present invention provides connectors for a decking system where the ends of the decking boards 20 need not be connected or joined over the supporting joists J. This means the rebates 34 can be cut or provided in the decking boards 20, without having to cut the decking boards 20 to accurate lengths. The connectors prevent the adjacent ends of the decking boards 20 flexing as a load is applied to, or passes over, the joint between the adjacent ends.

Where, however, the joints overlie the supporting joists J, screws or other fasteners can be driven through the bores 380 in the bodies of the connector members 341 to secure the connector members 341 to the joists j, thereby securely anchoring the ends of the decking boards 20 to the joists J.

In addition, the connectors can be produced relatively inexpensively (e.g. by injection moulding from polymers/plastics-materials), and are easy to install.

Other materials (e.g. cast or moulded metals, such as aluminium) and/or other profiles (e.g. for the connector members and/or the bridging member) may be used in the manufacture of the connectors.

Various changes and modifications may be made to the embodiments described and illustrated without departing from the present invention defined in the appended claims.

The invention claimed is:

1. A connector for interconnecting adjacent ends of a pair of decking boards of a decking system, the connector including:
   a connecting member, the connecting member having a body defined by a pair of substantially parallel side edges in plan view, a first, or inner, of the pair of side edges being operable to engage grooves or recesses in aligned side walls of the pair of decking boards, across a joint adjacent the respective ends of the pair of decking boards; and
   a bridging member extending substantially-laterally from the connecting member, the bridging member engaging in respective rebates in the adjacent ends of the pair of decking boards,
   wherein the bridging member has at least one horizontal top surface engageable by respective substantially horizontal top walls of the rebates in the ends of the adjacent pair of decking boards, and the bridging member is narrower than the connecting member.

2. The connector as claimed in claim 1, wherein:
   a second, or outer, of the side edges of the body configured to engage a groove or recess in a side wall of a decking board laid adjacent to the joint between the adjacent ends of the pair of decking boards.

3. The connector as claimed in claim 2, wherein:
   the second side edge engages a groove or recess intermediate the length of the adjacent decking board, so arranged that respective joints between adjacent ends of respective pairs of the decking boards are staggered or offset.

4. The connector as claimed in claim 1, wherein:
   the side edges of the body are of convergent profile in end view and are operable to engage the grooves or recesses of the pair of decking boards having complementary profiles; and
   the side edges of the body configured to engage the grooves or recesses in the side walls of the respective decking boards in a "wedge-type" engagement.

5. The connector as claimed in claim 1, wherein:
   the bridging member is relatively rigid, or non-deflectable, in a vertical plane, when in use; and
   the bridging member has a length selected so that at least a small clearance is provided between distal ends of the respective bridging members of a pair of the connectors at the joint between the ends of the pair of decking boards.

6. The connector as claimed in claim 1, wherein:
   the bridging member has at least one reinforcing rib or flange lying in the vertical plane and is of "T-shape", "inverted U-shape", triangular, cruciform, circular or box section.

7. The connector as claimed in claim 1, wherein:
the top surface has a drainage groove to enable moisture collected thereon to drain to a distal end of the bridging member or to a drain-hole in the bridging member.

8. The connector as claimed in claim 1, wherein:
the body of the connecting member has a lower body portion, having at least one block portion, surmounted by an upper body portion having the substantially parallel side edges; and
optional reinforcing ribs and/or flanges are provided on the side and/or end walls of the lower body portion to increase the mechanical strength of the lower body portion, while being able to absorb expansion of the adjacent decking boards, when in use.

9. The connector as claimed in claim 8, wherein:
the upper body portion is of solid construction, and has a substantially planar or convex top face interconnecting elongate upper faces of the side edges, where the elongate upper faces of the side edges are connected to complementary elongate lower faces on the side edges by a curved nose.

10. The connector as claimed in claim 1, wherein:
the connector is integrally manufactured, by injection moulding, from a suitable polymer/plastics-material, such as nylon (Registered Trade Mark), polyvinyl chloride (PVC), polyethylene, polypropylene, where the polymer/plastics-material is optionally UV-stabilized, cast or moulded from metals, such as aluminum, and optionally incorporates glass, carbon or other reinforcing fibers for increased mechanical strength.

11. A connector system comprising two connecting members of claim 1.

12. The connector system as claimed in claim 11, wherein:
one or more of the side edges of each body is engageable with a groove or recess intermediate of a side wall of a decking board laid adjacent to the joint between the adjacent ends of the pair of decking boards, so arranged that respective joints between adjacent ends of respective pairs of the decking boards will be staggered or offset.

13. The connector of claim 1 further comprising a second connecting member, wherein the second connecting member has a body defined by a pair of substantially parallel side edges in plan view, a first, or inner, of the pair of side edges being operable to engage grooves or recesses in aligned side walls of the pair of decking boards, across a joint adjacent the respective ends of the pair of decking boards; and
the bridging member connected to the first side edge of the second connecting member,
wherein the bridging member is adjustable in length in a horizontal plane, but is relatively rigid, or non-deflectable, in a vertical plane, when in use.

14. The connector as claimed in claim 13, wherein:
the bridging member is capable of flexing in a substantially "S-shape", "V-shape", or "U-shape", in plan view in the horizontal plane, when in use; or the bridging member is telescopic in length.

15. A decking system including:
a supporting structure;
a plurality of decking boards laid on the supporting structure, with each of the decking boards having respective recesses or grooves in their side walls and, optionally, rebates in their end walls; and
a plurality of the connectors, as claimed in claim 1;
wherein:
at least one connecting member of each of the plurality of the connectors is operably engaged with the grooves or recesses in aligned side walls of a pair of the decking boards arranged end-to-end across a joint, the, or each, connector securing the adjacent ends of the decking boards together.

16. The decking system as claimed in claim 15, wherein:
the bridging member of each of the plurality of connectors is engaged in the rebates of the adjacent ends of the pair of decking boards.

17. The decking system as claimed in claim 15, wherein:
the respective connecting members of each of the plurality of the connectors are also operably engaged in the grooves or recesses in the adjacent side walls of the respective decking boards laid adjacent to the joint between the adjacent ends of the pair of decking boards.

18. The decking system as claimed in claim 15, wherein:
an outer side edge of the body of each of the plurality the connectors is engageable with a groove or recess intermediate of a side wall of a decking board laid adjacent to the joint between the adjacent ends of the pair of decking boards, so arranged that respective joints between adjacent ends of respective pairs of the decking boards will be staggered or offset.

19. A connector for interconnecting adjacent ends of a pair of decking boards of a decking system, the connector including:
a connecting member, the connecting member having a body defined by a pair of substantially parallel side edges in plan view, a first, or inner, of the pair of side edges being operable to engage grooves or recesses in aligned side walls of the pair of decking boards, across a joint adjacent the respective ends of the pair of decking boards; and
a bridging member extending substantially-laterally from the connecting member, the bridging member engaging in respective rebates in the adjacent ends of the pair of decking boards and the bridging member is narrower than the connecting member,
wherein
the body of the connecting member has a lower body portion, having at least one block portion, surmounted by an upper body portion having the substantially parallel side edges; and
optional reinforcing ribs and/or flanges are provided on the side and/or end walls of the lower body portion to increase the mechanical strength of the lower body portion, while being able to absorb expansion of the adjacent decking boards, when in use, and wherein
the upper body portion is of solid construction, and has a substantially planar or convex top face interconnecting the elongate upper faces of the side edges, where the elongate upper faces of the side edges are connected to complementary elongate lower faces on the side edges by a curved nose.

20. The connector as claimed in claim 19, wherein:
the body has a bore extending therethrough to enable a fastener to secure the body to a supporting structure underlying the joint between the ends of the pair of decking boards.

* * * * *